Figure 5:
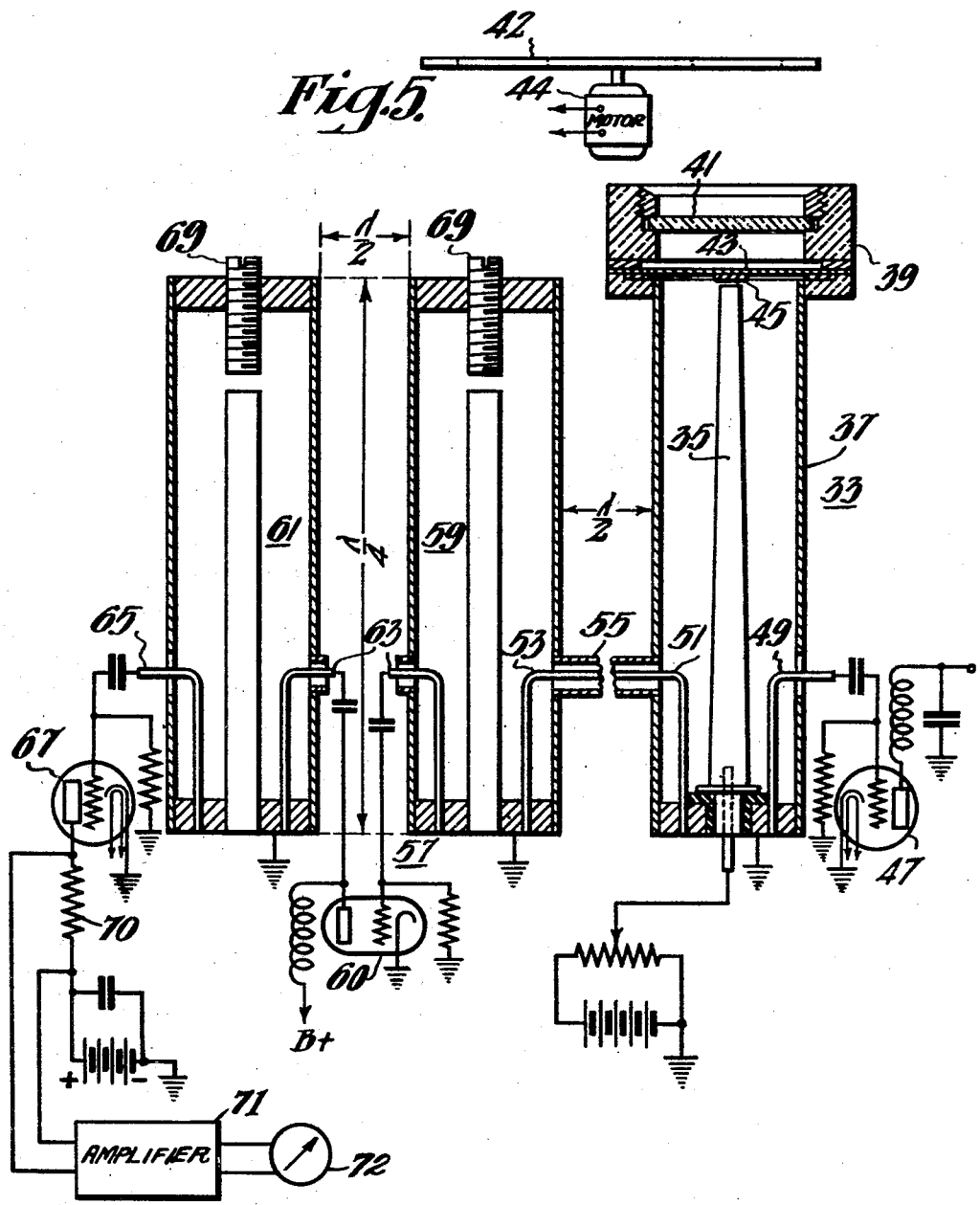

March 2, 1948.　　　　　J. EVANS　　　　　2,437,085
HEAT DETECTION DEVICE.
Filed March 12, 1943　　　　3 Sheets-Sheet 1
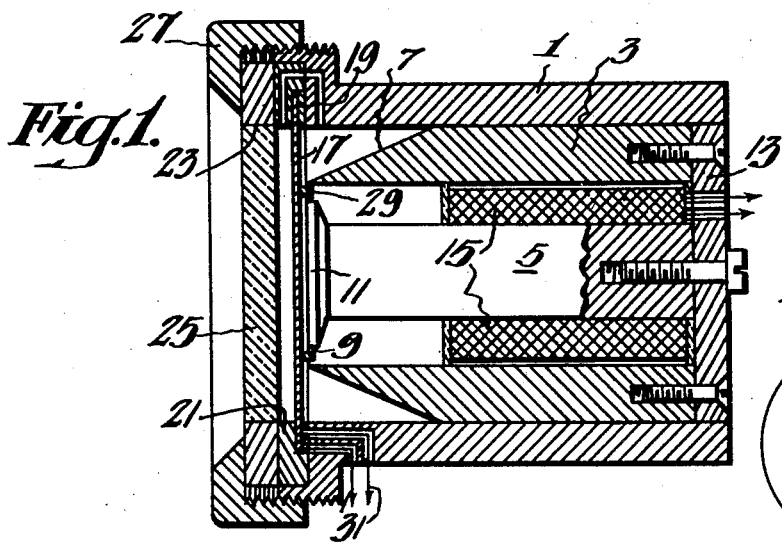
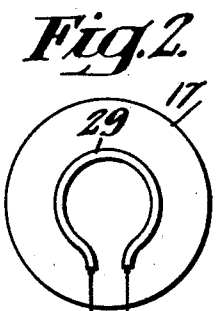
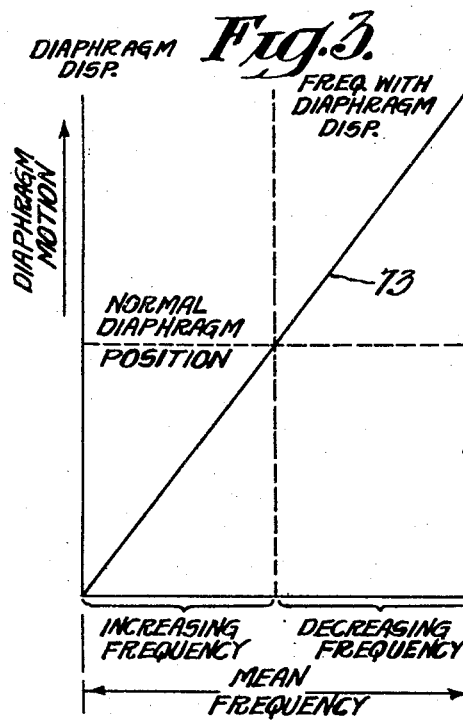
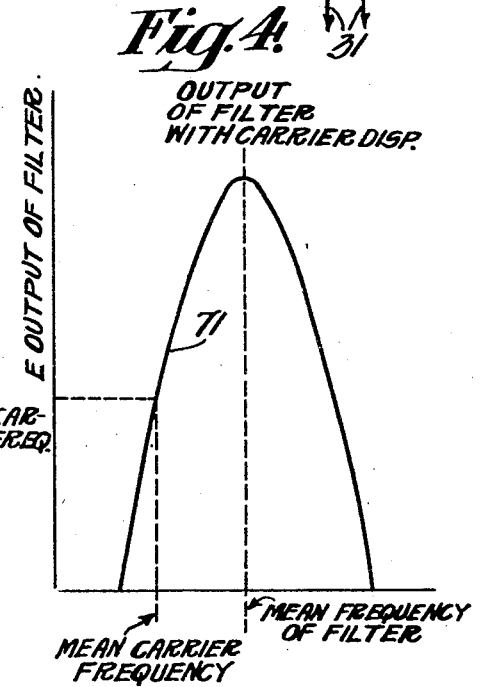
Inventor
John Evans March 2, 1948. J. EVANS 2,437,085
HEAT DETECTION DEVICE
Filed March 12, 1943 3 Sheets-Sheet 2

Inventor
John Evans
By
C. D. Tuska
Attorney

March 2, 1948.　　　　J. EVANS　　　2,437,085
HEAT DETECTION DEVICE
Filed March 12, 1943　　　　3 Sheets-Sheet 3

INVENTOR.
John Evans
BY C. D. Nuska
ATTORNEY

Patented Mar. 2, 1948

2,437,085

UNITED STATES PATENT OFFICE 2,437,085

HEAT DETECTION DEVICE

John Evans, Kingston, N. J., assignor to Radio Corporation of America, a corporation of Delaware Application March 12, 1943, Serial No. 478,969

13 Claims. (Cl. 73—362)

This invention relates to improvements in heat detecting devices and especially to a heat detecting device in which heat waves are impressed upon a frequency determining element in a high frequency generator whereby the frequency of the generator is varied as a function of the intensity of the heat to be detected.

It has been known that various substances absorb heat waves whereby pressure responsive elements actuate the armature of a capacitor. By observing the change in capacity the intensity of the heat may be measured or the source of heat may be located. Examples of such devices are found in Wolff U. S. Patent 2,234,528 for "Radiant energy receiving device" and in an application Serial No. 470,520, filed December 29, 1942, which resulted in Patent No. 2,422,971 for Heat responsive indicators, by R. D. Kell and W. A. Tolson.

The subject invention employs an extremely thin film which constitutes one wall of an airtight enclosure and upon which is deposited a heat absorbing material. The heat waves impinging on the diaphragm cause the enclosed gas to expand and cause the diaphragm to stretch. This change in the movement of the diaphragm produces a change in the capacity between the diaphragm and a stationary member which is preferably a portion of an oscillatory circuit. The frequency of the circuit is thus varied by application of the heat. These changes in frequency are detected and converted into currents which may be applied to a suitable indicator.

It has been found that the sensitivity of the heat detector of the present invention is very much greater than the prior art devices. Moreover, the present heat detector responds in a very short time interval whereby undesirable lag is eliminated.

One of the objects of the instant invention is to provide an improved heat detecting device. Another object is to provide an improved heat detecting device in which the heat to be detected is used to vary the frequency of a high frequency generator. An additional object is to provide a heat detecting device in which the steady application of heat is used to vary the amplitude of an alternating current. A still further object is to provide an improved means for and method of detecting heat rays whereby extremely small changes in temperature may be detected.

Figure 6:
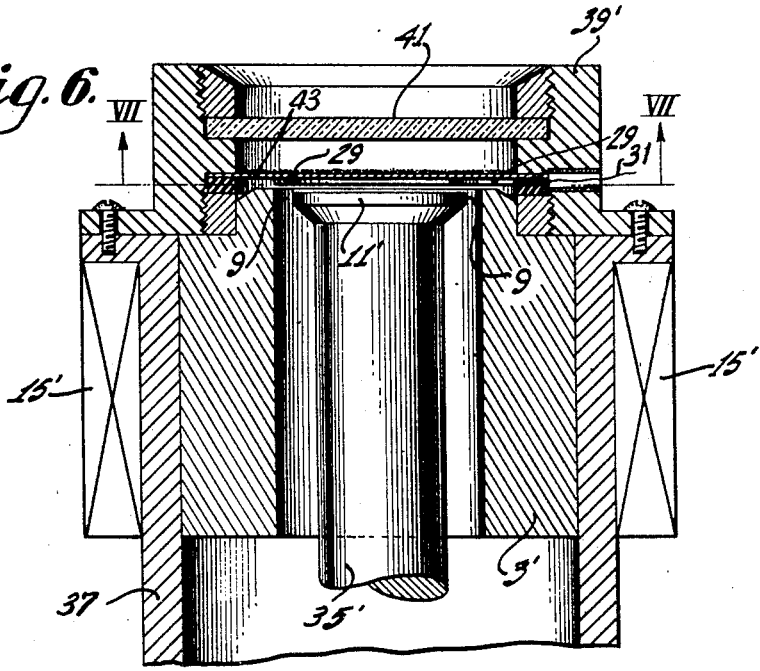
Figure 7:
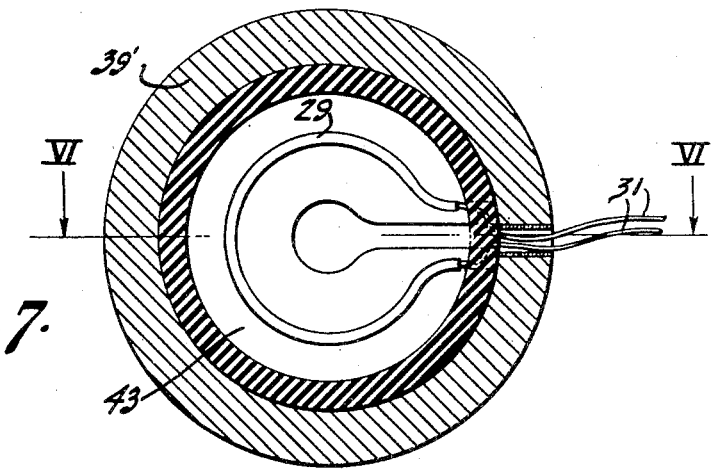

The invention will be described by referring to the accompanying drawings in which Figure 1 is a sectional view of one embodiment of the invention; Figure 2 is an elevational view of a component of the heat detector of Figure 1; Figures 3 and 4 are graphs showing the mode of operation of the device; Figure 5 is a circuit diagram of a modification of the invention; Figure 6 shows a modified form of the oscillator of Fig. 5, and Figure 7 is a section view taken on the lines VII—VII of Fig. 6.

Referring to Figure 1, within a suitable housing 1 are arranged a hollow cylindrical outer magnetic core 3 and an inner magnetic core 5. The hollow member 3 may be tapered as indicated by the sloping side 7. An air gap 9 is provided. The gap is defined by the inner portion of the core 3 and by a projection or pole piece 11 which is arranged at the upper end of the inner core 5. The two members 3, 5 are mounted on a plate 13 which is preferably made of magnetic material. A suitable solenoid 15 is arranged, within the cylindrical space between the members 3, 5, to provide the required magnetic flux. Opposite to the pole piece 11 and parallel thereto is arranged a thin diaphragm 17 which will be hereinafter described.

The diaphragm is clamped by suitable clamping rings 19, 21. An additional ring 23 is arranged to support a fixed diaphragm or lens 25 which is composed of a substance which transmits heat with a minimum of loss. Among the materials which may be used are rock salt and sylvite. The several rings are held in place by an outer clamping ring 27 which secures the fixed diaphragm and the thin diaphragm to the member 1 so as to form an air-tight enclosure between the two diaphragms.

A single conductor 29 is formed on the diaphragm 17 by plating thereto a turn of low conductive material which is positioned in the magnetic gap 9. This construction is illustrated in Figure 2. Suitable flexible leads 31 provide a connection to the conductor 29 whereby it may be energized by a varying current of the desired wave form to drive the diaphragm.

The thin diaphragm 17 as well as the conductor 29 have been greatly exaggerated in thickness in Figure 1. In practice, a diaphragm may be composed of pure nitrocellulose which is made sufficiently plastic to prevent breakage. Moreover, a moisture repellant ingredient is included to minimize the effects of humidity. By way of example, one composition is approximately as follows:

| | | |
|---|---|---|
| Pear oil | cubic centimeters | 50 |
| Pure cellulose nitrate | grams | 1 |
| Formaldehyde | cubic centimeters | .01 |
| Chrome alum | grams | .1 |
| Synthetic camphor (Dupont) | do | .25 |
| Glycerine | cubic centimeters | .01 |

The ingredients are dissolved in the above sequence. The method of forming the diaphragm is to deposit the ring or frame on which the diaphragm is to be formed at the bottom of a container. The frame is completely covered with distilled water upon whose surface is deposited a few drops of the above described solution. A film is quickly formed on the surface of the water and after a short time the exposed surface of the film is sufficiently dry. Thereafter, the film is lowered and deposited on the frame by gradually and carefully lowering the water level. The film dries completely on the frame becoming very tight and exhibiting considerable elasticity when stretched or deformed.

The heat absorbing characteristic is obtained by depositing a suitable layer on the outer surface of the diaphragm which is within the airtight enclosure. This is done by evaporation in an oxygen atmosphere of approximately 3 mm. of mercury. A suitable radiant energy absorbing layer may be formed by zinc which is alloyed with antimony, so as to decrease the evaporation potential of the zinc. The oxygen atmosphere oxidizes the zinc whereby it becomes a black deposit having a high degree of absorption for heat waves extending through the entire heat spectrum and into the far infra red.

On the opposite side of the diaphragm a metallic coating is used to form either the armature of a capacitor or the inductive turn previously described. The desired shape of the inductor or the armature may be determined by masking the portions which are not to be coated. It is widely known that pure silver may be deposited in a vacuum system.

Referring to Figure 5, one complete circuit arrangement, including the high frequency generator, discriminator and rectifier is represented. The generator includes a quarter wave concentric line 33 consisting of an inner conductor 35 and an outer conductor 37. A heat detecting element of the capacitor type is secured at the high potential end of the quarter wave line by means of an insulated clamping member 39. The heat detecting element includes a rock salt window or diaphragm 41 and a thin diaphragm 43. A chopper 42, which is driven by a motor 44, is inserted between the rock salt window and the heat source to interrupt the heat waves at any desired rate. The outer surface of the diaphragm is coated with a heat absorbing material of the type previously described. The inner surface of the diaphragm includes a silver armature 45 which is deposited as previously set forth. The armature is grounded by a lead not shown. A vacuum tube 47 is coupled to the concentric line by means of the conductor 49 which is arranged within the outer conductor 37. The vacuum tube 47, together with the line 33, form a high frequency generator whose frequency is determined primarily by the length of the concentric line and the capacitor element formed by the armature 45 and the inner conductor 35.

The high frequency oscillations are applied through coupling conductors 51, 53 and a half wave transmission line 55 to a filter 57 which consists of a pair of quarter wave concentric lines 59, 61 which are coupled together by a half wave transmission line 63. Either or both of the coupling lines 55, 63 may include a radio frequency amplifier 60 which is illustrated in connection with line 63 but is not shown in line 55. The quarter wave line 61 is coupled by the coupling conductor 65 to the detector or rectifier 67. The rectified output voltage which appears across the rectifier load resistor 70 may be amplified by a suitable amplifier 71 and applied to any desired form of indicator, such as a meter 72. If the chopper 42 is not used, a direct current amplifier will be required. If the chopper is used, the amplifier will, of course, be one suitable for amplification of the modulation or chopper frequency.

The mode of operation of the device shown in Figure 5 is essentially as follows:

In the absence of heat waves the concentric line 33 will determine the frequency of the oscillations generated by the tube 47. These oscillations are applied through the half wave line 55 to the quarter wave line 59 forming part of the filter circuit 57 and hence through the half wave line 63 to the quarter wave line 61 forming part of the filter circuit 57. The characteristic of the filter circuit is shown in Fig. 4. The frequency of the filter 57 is adjusted with respect to the frequency of the generator by means of the screws 69 so that the mean carrier falls about midway along the sloping part of the curve 71, as shown in the graph. Thus adjusted, the filter 57 and detector 67 act as a frequency discriminator. If the chopper 42 is in operation, the output of the detector 67 will include a current, whose frequency corresponds to the frequency of the chopper.

In the presence of heat waves the heat absorbent layer on the diaphragm will absorb heat, the diaphragm will stretch, and the capacitance change will alter the frequency characteristic of the quarter wave line 33 and hence the frequency of the generated currents. The foregoing operation is represented by the line 73 of Fig. 3. The output currents will have an amplitude which represents the intensity of the applied heat waves and a frequency which corresponds to the frequency of the chopper. The chopper may be omitted but it is preferably included because the chopper produces alternating or varying currents which may be amplified more easily than direct currents which would be derived from the discriminator in the absence of the chopper.

The arrangement of Fig. 1 may be employed according to the foregoing method by applying to the conductor 29 varying currents which drive the diaphragm whereby the chopper 42 of Fig. 5 may be omitted. In that case the heat detecting cell is made a part of the high frequency generator by fixing to the diaphragm 43 the conductor 29, instead of the capacity armature 45, and by arranging the elements 3, 5, 11 and 15 which comprise the magnetic field-producing structure, or their equivalent, in the upper portion of the quarter wave line 33. This modified arrangement is illustrated in Figs. 6 and 7, in which parts corresponding to similar parts in Figs. 1 and 5 have been designated by the same reference numeral with a prime ('), while identical parts bear the same reference numerals. The inner conductor 35' is of magnetically permeable material and has the function of providing a magnetic field corresponding to that produced by core 5 of Fig. 1, and also acts as the inner conductor 35 in co-operation with the outer conductor 37 (of Fig. 5) to form a resonant line 33. The magnetic elements are preferably copper plated in accordance with conventional practice to reduce high frequency eddy currents. The arrangement of Figure 1 may also be used as follows: In the absence of heat waves, the diaphragm will be stationary if no varying currents are applied to the conductor 29, and steady currents are applied to the solenoid 15. Thus no currents will be induced in the conductor 29. If heat waves are applied, the diaphragm 17 and the conductor 29 will move and therefore a current will be established in the conductor 29. This current may be applied to an indicator which is not shown.

Another method of operating the device of Figure 1 is to apply varying or alternating currents to the solenoid 15 so that movements of the diaphragm 17 and conductor 29 produced by the applied heat will induce alternating currents in the conductor. These alternating currents will have a frequency corresponding to the frequency of the alternating currents applied to the solenoid and an amplitude varying as a function of the intensity of the applied heat waves. The output currents may be amplified and indicated.

Thus the invention has been described as a heat detection device in which a layer of heat absorbing material has been deposited upon an extremely thin diaphragm. Under the influence of heat waves, the diaphragm moves toward or away from a frequency determining element. The movement produces varying currents which are detected and indicated. The amplitude of the currents is a measure of the intensity of the applied heat waves. According to one method of operation, the effects of the heat waves upon the diaphragm are applied to a carrier current to produce frequency modulation. In another mode of operation alternating currents are established by the heat waves. The amplitude of the alternating currents is a measure of the heat wave intensity.

I claim as my invention:

1. A heat detection device including in combination an oscillator for generating radio frequency currents, said oscillator including a concentric line frequency determining element, a heat detector effectively connected to said element whereby the application of heat produces a change in frequency, a frequency discriminator connected effectively to said oscillator for converting said radio frequency currents into currents of frequency corresponding to said change in frequency, and means for indicating said converted currents thereby to indicate said heat.

2. A heat detection device including in combination a radio frequency generator including a quarter wave concentric line, one end of said line including a capacitive element, said element having a heat absorption surface whereby said capacity varies as a function of the heat to be detected, means effectively connected to said quarter wave line for converting said radio frequency currents into a current corresponding to the frequency changes produced by the capacity changes of said element, and means for indicating said converted currents whereby said heat is indicated.

3. A device of the character of claim 2 including a diaphragm disposed between said heat absorption surface and said heat to be detected, said diaphragm having low heat attenuation properties.

4. A heat detection device including in combination a radio frequency generator including a quarter wave concentric line, one end of said line including a capacitive element, said element having a heat absorption surface whereby the capacity of said element varies as a function of the heat to be detected, means effectively connected to said quarter wave line for amplifying said radio frequency changes, detection means connected to said amplifier for converting said amplified radio frequency currents into a current corresponding to the frequency changes produced by the capacity changes of said element, and means for indicating said converted currents whereby said heat is indicated.

5. A heat detection device including in combination an oscillator for generating high frequency currents, said oscillator including a variable frequency determining element, said frequency determining element having a heat absorption surface upon which the heat to be detected is applied to vary said frequency, means for varying the frequency as determined by said frequency determining element at a predetermined rate, means connected to said oscillator for converting said high frequency currents into a current including a component corresponding to the variation produced by said heat to be detected, means connected to said conversion means for selecting said component, and an indicator for indicating said selected component.

6. A heat detection device including in combination an oscillator for generating high frequency currents, said oscillator including a variable frequency determining element, said frequency determining element having a heat absorption surface whereby the heat to be detected varies said frequency, additional means for varying the frequency of said high frequency currents at a lower frequency rate, means connected to said oscillator for converting said high frequency currents into a current including a component corresponding to the variation produced by said heat to be detected, means connected to said conversion means for selecting said component, and an indicator for indicating said selected component.

7. A heat detection device including in combination a thin film diaphragm, a layer of heat absorbing material applied to said diaphragm whereby heat absorbed by said material stretches said diaphragm, a reactor having one element movable with said diaphragm and another element fixed with respect to said diaphragm, and means for applying a current to said reactor whereby said movements establish component currents having an amplitude corresponding to the intensity of applied heat waves.

8. A heat detection device including in combination a thin film diaphragm, a layer of heat absorbing material applied to said diaphragm whereby heat absorbed by said material stretches said diaphragm, a variable capacitor having one element movable with said diaphragm and another element fixed with respect to said diaphragm, and means for applying a current to said variable capacitor whereby said movements establish component currents having an amplitude corresponding to the intensity of applied heat waves.

9. A heat detection device including in combination a thin film diaphragm, a layer of heat absorbing material applied to said diaphragm whereby heat absorbed by said material stretches said diaphragm, a variable inductor having one element movable with said diaphragm and another element fixed with respect to said diaphragm, and means for applying a current to said variable inductor whereby said movements establish component currents having an amplitude corresponding to the intensity of applied heat waves.

10. A device according to claim 1, including a chopper disposed between the heat to be detected and said heat responsive detector for interrupting the heat to be detected whereby a variable frequency is applied to the detected heat waves.

11. A heat detection device including in combination a thin film diaphragm and a fixed diaphragm, the latter being composed of a material which transmits heat with a minimum loss, means peripherally mounting said diaphragms in spaced parallel relationship, a conductor of negligible weight fixed on and movable with said thin film diaphragm, a layer of heat absorbing material attached to said diaphragm, and means for establishing a magnetic field arranged to embrace said conductor, whereby movements of said thin film diaphragm and conductor induce currents in said conductor.

12. A heat detection device including in combination a thin film diaphragm of plastic nitrocellulose and a fixed diaphragm composed of a material which transmits heat with a minimum loss, means peripherally mounting said diaphragms in spaced parallel relationship, a conductor of negligible weight fixed on and movable with said thin film diaphragm, a layer of heat absorbing material attached to said diaphragm, and means for establishing a magnetic field arranged to embrace said conductor, whereby movements of said thin film diaphragm and conductor induce currents in said conductor.

13. A heat detector including in combination a thin film diaphragm and a fixed diaphragm, the latter being composed of a material which transmits heat with a minimum loss, means peripherally mounting said diaphragms in spaced parallel relationship, a layer of heat absorbing material attached to the surface of said thin film diaphragm which is adjacent said fixed diaphragm whereby heat absorbed by said material causes said diaphragm to stretch, a variable capacitor having one element movable with said diaphragm and another element fixed with respect to said diaphragm, and means for applying a current to said variable capacitor whereby said movements establish component currents having an amplitude corresponding to the intensity of the applied heat waves.

JOHN EVANS.

REFERENCES CITED

The following references are of record in the file of this patent:

UNITED STATES PATENTS

| Number | Name | Date |
| --- | --- | --- |
| 1,604,532 | Riegger | Oct. 26, 1926 |
| 1,632,332 | Hayes | June 14, 1927 |
| 1,639,713 | Sykes | Aug. 23, 1927 |
| 1,779,114 | Cutting et al. | Oct. 21, 1930 |
| 1,859,170 | Rersz | May 17, 1932 |
| 1,951,276 | Edwards et al. | Mar. 13, 1934 |
| 1,972,009 | Crowe | Aug. 28, 1934 |
| 2,011,710 | Davis, Jr. | Aug. 20, 1935 |
| 2,027,193 | Muth | Jan. 7, 1936 |
| 2,042,490 | Zahl | June 2, 1936 |
| 2,080,902 | Uyterhoeven et al. | May 18, 1937 |
| 2,288,788 | Clark et al. | July 7, 1942 |
| 2,357,193 | Harrison | Aug. 29, 1944 |